United States Patent
Uehara et al.

(10) Patent No.: US 9,281,519 B2
(45) Date of Patent: Mar. 8, 2016

(54) POSITIVE ELECTRODE ACTIVE MATERIAL FOR SECONDARY BATTERY AND SECONDARY BATTERY USING THE SAME

(75) Inventors: Makiko Uehara, Kanagawa (JP); Takehiro Noguchi, Kanagawa (JP)

(73) Assignee: NEC ENERGY DEVICES, LTD., Kanagawa (JP)

( * ) Notice: Subject to any disclaimer, the term of this patent is extended or adjusted under 35 U.S.C. 154(b) by 317 days.

(21) Appl. No.: 13/810,506

(22) PCT Filed: Jul. 25, 2011

(86) PCT No.: PCT/JP2011/066864
§ 371 (c)(1),
(2), (4) Date: Jan. 16, 2013

(87) PCT Pub. No.: WO2012/014846
PCT Pub. Date: Feb. 2, 2012

(65) Prior Publication Data
US 2013/0136987 A1    May 30, 2013

(30) Foreign Application Priority Data
Jul. 30, 2010 (JP) .................................. 2010-172317

(51) Int. Cl.
*H01M 4/485* (2010.01)
*H01M 4/1315* (2010.01)
(Continued)

(52) U.S. Cl.
CPC ............ *H01M 4/485* (2013.01); *H01M 4/1315* (2013.01); *H01M 4/505* (2013.01); *H01M 4/525* (2013.01); *H01M 10/052* (2013.01); *Y02E 60/122* (2013.01); *Y02T 10/7011* (2013.01)

(58) Field of Classification Search
CPC ......... H01M 4/00–4/62; H01M 4/845; H01M 4/505; H01M 4/1315; H01M 10/052; H01M 4/485; H01M 4/525; Y02T 10/7011; Y02E 60/122

USPC .......................................... 429/231.5, 231.95
See application file for complete search history.

(56) References Cited

U.S. PATENT DOCUMENTS

2003/0086863 A1*  5/2003  Noguchi et al. .............. 423/599
2004/0202938 A1* 10/2004  Noguchi et al. ......... 429/231.95
2006/0199080 A1*  9/2006  Amine et al. ................. 429/326

FOREIGN PATENT DOCUMENTS

CN          1412872 A      4/2003
CN          1545743 A     11/2004
(Continued)

OTHER PUBLICATIONS

Machine translation of JP 2000-203843A, obtained Nov. 2014.*
(Continued)

*Primary Examiner* — Milton I Canon
*Assistant Examiner* — Philip A Stuckey
(74) *Attorney, Agent, or Firm* — Sughrue Mion, PLLC

(57) ABSTRACT

Provided is a lithium ion positive electrode active material for a secondary battery that can realize a high operating voltage and a high capacity while suppressing capacity drop with cycles by using a low-cost material. A positive electrode active material for a secondary battery, which is a lithium manganese composite oxide represented by the following general formula (I)

$$Li_a(M_xMn_{2-x-y}Y_y)(O_{4-w}Z_w) \qquad (I)$$

wherein in the formula (I), $0.5 \leq x \leq 1.2$, $0 < y \leq 0.3$, $0 \leq a \leq 1.2$, and $0 < w \leq 1$; M contains at least Fe and may further contain at least one selected from the group consisting of Ni, Cr and Cu other than Fe; Y is at least one selected from the group consisting of Li, Be, B, Na, Mg, Al, K, Ca, Ti and Si; and Z is at least one of F and Cl.

8 Claims, 2 Drawing Sheets

(51) Int. Cl.
  *H01M 4/505* (2010.01)
  *H01M 4/525* (2010.01)
  *H01M 10/052* (2010.01)

(56) References Cited

FOREIGN PATENT DOCUMENTS

| CN | 101409346 A | 4/2009 |
|---|---|---|
| CN | 101542787 A | 9/2009 |
| JP | 09270259 A | 10/1997 |
| JP | 2000-090923 A | 3/2000 |
| JP | 2000-203843 A | 7/2000 |
| JP | 2001093528 A | 4/2001 |
| JP | 2001-176557 A | 6/2001 |
| JP | 2002-042816 A | 2/2002 |
| JP | 2002-151080 A | 5/2002 |
| JP | 2002-184404 A | 6/2002 |
| JP | 2010-097845 A | 4/2010 |

OTHER PUBLICATIONS

Takahashi et al., JP 2002-184404 A, English machine translation obtained on Apr. 6, 2015.*

Communication dated May 13, 2014 from the Japanese Patent Office in counterpart Japanese Application No. 2010-172317.

Communication dated Aug. 27, 2014, from the State Intellectual Property Office of the People's Republic of China in counterpart Chinese Application No. 201180037519.1.

Ohzuku, Tsutomu, et al., "Solid-state redox potentials for Li[Me1/2Mn3/2]O4 (Me: 3d-transition metal) having spinel-framework structures: a series of 5 volt materials for advanced lithium-ion batteries," Journal of Power Sources, 1999, pp. 90-94, vols. 81-82.

Kawai, Hiroo, et al., "High-voltage lithium cathode materials," Journal of Power Sources, 1999, pp. 67-72, vols. 81-82.

* cited by examiner

POSITIVE ELECTRODE ACTIVE MATERIAL FOR SECONDARY BATTERY AND SECONDARY BATTERY USING THE SAME

CROSS REFERENCE TO RELATED APPLICATIONS

This application is a National Stage of International Application No. PCT/JP2011/066864, filed on Jul. 25, 2011, which claims priority from Japanese Patent Application No. 2010-172317, filed Jul. 30, 2010, the contents of all of which are incorporated herein by reference in their entirety.

TECHNICAL FIELD

This exemplary embodiment relates to a positive electrode active material for a secondary battery having a spinel-type manganese composite oxide low in cost and high in energy density and a secondary battery using the same.

BACKGROUND ART

A lithium ion secondary battery is characterized by being small in size and large in capacity and widely used as a power supply for cellular phones, notebook computers and others. However, recently in the circumstances where mobile electronics have been rapidly advanced and use of lithium ion secondary batteries in electric cars has been realized, a further improvement of energy density is desired. As a positive electrode active material of a lithium ion secondary battery, $LiCoO_2$ and $LiNiO_2$ are well known. However, raw materials for these positive electrode active materials are expensive and, in addition, a safety in a charge state is questioned. These problems are made apparent particularly when the battery is used in large-size products such as automobiles.

As another positive electrode active material, a lithium manganese composite oxide, $LiMn_2O_4$ having a spinel-type crystal structure has been aggressively studied. $LiMn_2O_4$ is regarded as a promising positive electrode active material for a lithium secondary battery since a raw material Mn is abundantly present as a resource and provided at relatively low cost. Besides these, $LiMn_2O_4$ is highly stable during overcharge and at a high temperature. However, $LiMn_2O_4$ deteriorates with cycles and causes capacity drop at a high temperature. This is conceivably caused by instability of $Mn^{3+}$. To describe more specifically, when the average valence of Mn ion changes between a trivalent state and a quadrivalent state, Jahn-Teller strain generates in a crystal and lowers stability of a crystal structure. Due to this, performance and the like presumably deteriorate with cycles.

In order to reduce the Jahn-Teller strain, study has been made for substituting Mn with another element. Substitution of Mn with another element reinforces binding force. Patent Literature 1 discloses a positive electrode active material represented by $LiMn_2O_4$ in which $Mn^{3+}$ is substituted with another metal. To describe more specifically, Patent Literature 1 describes a secondary battery having a manganese composite oxide having a spinel structure and represented by a composition formula, $LiM_xMn_{2-x}O_4$ (M is one or more selected from Al, B, Cr, Co, Ni, Ti, Fe, Mg, Ba, Zn, Ge and Nb; and $0.01 \leq x \leq 1$). Furthermore, a case where $LiMn_{1.75}Al_{0.25}O_4$ is used as a positive electrode active material is specifically disclosed.

Furthermore, a lithium manganese composite oxide has a discharge potential of 4.2 V or less and a low discharge capacity. Thus, increasing energy density is a technical problem. As a method for improving the energy density of a lithium ion secondary battery, a method for increasing the operating potential of the battery is effective. It has been so far known that a 5 V-level operating potential can be realized by substituting a part of Mn of $LiMn_2O_4$ with an element such as Ni, Co, Fe, Cu and Cr (for example, Patent Literature 2, Non Patent Literature 1 and Non Patent Literature 2). Of the substitution elements that can realize such a 5 V-level operating, particularly an element using Fe is favorable in view of resource, environment and cost, and demand is expected to increase in various industrial fields including the automobile industry.

By substituting Mn with Fe, Mn is present in a quadrivalent state, discharge is caused by the reaction of $Fe^{3+} \rightarrow Fe^{4+}$ in place of the oxidation-reduction reaction of $Mn^{3+} \rightarrow Mn^{4+}$. Since the reaction of $Fe^{3+} \rightarrow Fe^{4+}$ has a high potential of 4.5 V or more, it can be expected to function as a 5 V-level electrode material. In Patent Literature 2, a manganese iron lithium composite oxide of a spinel-type structure, which is represented by $Li[Fe_{1/2+x}Me_yMn_{3/2-x-y}]O_4$ (note that, $0 \leq x$, $0 < y$, $x+y \leq \frac{1}{2}$; and Me is represented by one or two or more of Cr, Co and Al) is synthesized to realize a positive electrode active material having an oxidation-reduction potential of about 5 V.

CITATION LIST

Patent Literature

Patent Literature 1: JP2001-176557A
Patent Literature 2: JP2000-90923A

Non Patent Literature

Non Patent Literature 1: H. Kawai et al., Journal of Power Sources, vol. 81-82, pp. 67-72, 1999
Non Patent Literature 2: T. Ohzuku et al., Journal of Power Sources vol. 81-82, pp. 90-94, 1999

SUMMARY OF INVENTION

Technical Problem

However, the 5 V-level positive electrode active material has problems in that capacity drop with cycles and deterioration of a crystal structure at a high temperature tend to occur and discharge capacity value cannot be theoretically obtained. In these respects, there is room for improvement. With respect to a 4 V-level lithium ion secondary battery, several studies have been made. However, a potential is produced by a 5 V-level positive electrode active material in a different mechanism from a 4 V-level positive electrode active material. Thus, in improving cycle characteristics, a different design concept from that of the 4 V-level positive electrode active material is required to design a positive electrode active material.

This exemplary embodiment is directed to providing a positive electrode active material for a lithium ion secondary battery that can realize a high operating voltage and a high capacity while suppressing capacity drop with cycles by using a low-cost material, and a positive electrode for a secondary battery and secondary battery using the same.

Solution to Problem

The positive electrode active material for a secondary battery according to this exemplary embodiment is a lithium manganese composite oxide represented by the following general formula (I)

$$Li_a(M_xMn_{2-x-y}Y_y)(O_{4-w}Z_w) \quad (I)$$

wherein in the formula (I), 0.5≤x≤1.2, 0<y≤0.3, 0≤a≤1.2, and 0<w≤1; M contains at least Fe and may further contain at least one selected from the group consisting of Ni, Cr and Cu other than Fe; Y is at least one selected from the group consisting of Li, Be, B, Na, Mg, Al, K, Ca, Ti and Si; and Z is at least one of F and Cl.

Advantageous Effects of Invention

According to this exemplary embodiment, it is possible to provide a positive electrode active material for a lithium ion secondary battery that can realize a high operating voltage and a high capacity while suppressing capacity drop with cycles in a lithium manganese composite oxide, which is a 5 V-level positive electrode active material using a low-cost material, and a positive electrode for a secondary battery and a secondary battery using the same.

DESCRIPTION OF EMBODIMENTS

Figure 1:
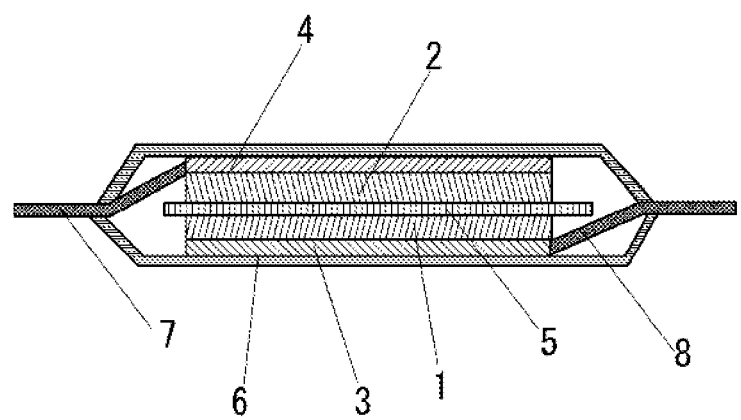
FIG. 1 is a sectional view showing an example of a secondary battery according to this exemplary embodiment.

Positive Electrode Active Material for Secondary Battery

The positive electrode active material for a secondary battery according to this exemplary embodiment is a lithium manganese composite oxide represented by the following general formula (I):

$$Li_a(M_xMn_{2-x-y}Y_y)(O_{4-w}Z_w) \quad (I)$$

wherein in the formula (I), 0.5≤x≤1.2, 0<y≤0.3, 0≤a≤1.2, and 0<w≤1; M contains at least Fe and may further contain at least one selected from the group consisting of Ni, Cr and Cu other than Fe; Y is at least one selected from the group consisting of Li, Be, B, Na, Mg, Al, K, Ca, Ti and Si; and Z is at least one of F and Cl.

In the positive electrode active material for a secondary battery according to this exemplary embodiment, M in the above general formula (I) contains at least Fe. As a 5 V-level spinel-type positive electrode active material, an oxide substituted with Ni and Co is well known. In this exemplary embodiment, cost can be reduced by using an oxide mainly formed of Fe and Mn as a positive electrode active material. In the case where a battery is used in large-size products such as automobiles and power storage units, since high or low in raw material price and change in raw material price have a large effect on a battery price, it is advantageous to use especially Fe abundantly present as a resource, as a raw material. Furthermore, if the case where Mn is substituted with Fe is compared to the case of a $LiMn_2O_4$ material, an oxidation-reduction reaction of $Fe^{3+}$ and $Fe^{4+}$ takes place along with the absorption and desorption reaction of Li. Since the potential of the reaction is 4.8 V or more to Li, a charge-discharge region of 4.8 V or more to a lithium reference potential is present. Therefore, the average discharge voltage of a battery can be increased and the energy density of the battery can be increased. Note that, whether a charge-discharge region of 4.8 V or more to a lithium reference potential is present can be determined by a charge-discharge test.

In the above general formula (I), M may further contain at least one selected from the group consisting of Ni, Cr and Cu other than Fe. More specifically, in the above general formula (I), M contains at least one selected from the group consisting of Fe, Ni, Cr and Cu and at least Fe. Ni, Cr and Cu each are a transition metal that may have both states of a trivalence or less and larger than the valence. In the above general formula (I), if M further contains at least one selected from the group consisting of Ni, Cr and Cu other than Fe, the ratio of Fe in M is preferably 20 to 99%. However, it is more preferable that M consists of Fe alone because cost can be reduced.

In this exemplary embodiment, the composition ratio x of M in the above general formula (I) is 0.5≤x≤1.2, preferably, 0.5≤x≤1.0 and more preferably, 0.6≤x≤1.0.

If x satisfies 0.5 or more, a 5 V-level operating potential can been ensured. Further, a state of a manganese close to a quadrivalence can be obtained, with the result that improvement of a battery cycle at a high temperature can be achieved. In contrast, if $Mn^{3+}$ remains in a lithium manganese composite oxide, a disproportionate reaction represented by the following reaction equation occurs by free acid (HF) in an electrolytic solution.

$$2Mn^{3+} \to Mn^{2+} + Mn^{4+}$$

$Mn^{2+}$ generated by the disproportionate reaction is dissolved in the electrolytic solution, precipitates, for example, on the separator of a battery and the surface of carbon as a negative electrode, and causes inhibition of a charge-discharge reaction. In this exemplary embodiment, since x is set at 0.5 or more, the amount of $Mn^{3+}$ can be reduced to suppress such a phenomenon. As a result, a satisfactory high-temperature cycle characteristics can be realized. In contrast, if x is less than 0.5, the average discharge voltage of a battery is low and the disproportionate reaction occurs. Such a case is not preferable. Furthermore, if x exceeds 1.2, capacity reduces. Such a case is not preferable.

In the positive electrode active material for a secondary battery according to this exemplary embodiment, in the above general formula (I), Y is at least one selected from the group consisting of Li, Be, B, Na, Mg, Al, K, Ca, Ti and Si. Of them, Li, Be, B, Na, Mg, Al, K and Ca are elements having a monovalence to trivalence and lighter than Mn. If the element is used as Y, a high operating potential can be realized while preventing a valence change of Mn and the weight of the electrode is reduced. In this manner, a battery capacity per mass can be improved. In addition, Ti and Si each are also an element lighter than Mn and excellent in chemical stability. If the element is used as Y, weight reduction can be made, improvement of energy density per mass can be realized. Of them, at least one selected from the group consisting of Li, Mg, Al, Si and Ti is preferable and at least one selected from the group consisting of Li, Mg and Al is more preferable. This is because energy density per mass can be effectively increased while suppressing reduction of discharge capacity.

In this exemplary embodiment, the composition ratio y of Y in the above general formula (I) is 0<y≤0.3, preferably, 0.05≤y≤0.3 and more preferably, 0.1≤y≤0.2. If y satisfies 0<y≤0.3, high capacity and long life can be attained. In contrast, if y exceeds 0.3, capacity reduces. Such a case is not preferable.

In the positive electrode active material for a secondary battery according to this exemplary embodiment, Z in the above general formula (I) is at least one of F and Cl.

In the lithium manganese composite oxide according to the exemplary embodiment, not only Mn but also oxygen is substituted. Owing to this, energy density can be further increased. If a part of Mn is substituted with Y of a monovalent state to trivalent state, $Mn^{3+}$ and $Fe^{3+}$ contributing to charge-discharge are likely to be converted into $Mn^{4+}$ and $Fe^{4+}$. This is because if quadrivalent Mn is substituted with Y of a trivalent state or less, the valences of Mn and Fe tend to increase in order to keep the total valence of the entire oxide at zero. If $Mn^{3+}$ and $Fe^{3+}$ are converted into $Mn^{4+}$ and $Fe^{4+}$, the amount of components contributing to charge-discharge in a positive electrode active material reduces and capacity reduces.

In this exemplary embodiment, to suppress such a capacity reduction, a part of oxygen is substituted with Z. Since oxygen has—divalence, whereas F and Cl represented by Z have—monovalence, by virtue of such substitution, the total amount of charges of the entire oxide can be kept at zero without increasing the valences of Mn and Fe even if Mn is substituted with a metal of a trivalent state or less. As described above, in this exemplary embodiment, battery capacity reduction caused by valence changes of Mn and Fe, which occurs when Mn is substituted with Y, can be effectively suppressed by substituting oxygen with Z. Furthermore, in the case where Y is quadrivalent Ti or Si, effect of reducing impurities can be obtained by substituting a small amount of Z.

In this exemplary embodiment, the composition ratio w of Z in the above general formula (I) is $0<w\leq1$, preferably, $0<w\leq0.3$, and more preferably, $0<w\leq0.2$. If w satisfies $0<w\leq1$, high capacity and long life can be attained. In contrast, if w exceeds 1, capacity reduces. Such a case is not preferable.

In this exemplary embodiment, if Mn is substituted with Y, which is a stable element having a monovalent state to a quadrivalent state and further oxygen is substituted with F or Cl, capacity can be increased. If the valence of Fe is changed by element substitution, capacity value reduces. Thus, the amount of oxygen to be substituted with Z preferably falls within the range in which valence change of Fe will not occur. In the state where Li is absorbed in a spinel (discharge state), Fe is preferably a trivalence. The substitution amount w of oxygen and the substitution amount y of Mn with Y preferably satisfy the relationship:

$$(4-n) \times y \times 0.1 < w < (4-n) \times y \times 1.5$$

where the valence of Y is n;
more preferably satisfy the relationship:

$$(4-n) \times y \times 0.2 < w < (4-n) \times y \times 1.2;\text{ and}$$

particularly preferably satisfy the relationship:

$$w = (4-n) \times y.$$

Note that, the substitution element Y of Mn is not limited to one element. For example, provided that Y consists of Y1 (valence: n1) and Y2 (valence: n2) and the composition ratio of Y1 and Y2 is Y1/Y2=m1/m2, the portion of $(4-n)\times y$ in the above formula is expressed by $[4-\{n1\times m1/(m1+m2)+n2\times m2/(m1+m2)\}]\times y$. In the state where such a relationship is kept, the amount of movable Li is kept to be equal before and after substitution of Mn with Y. As a result, the total mass can be reduced and capacity can be increased while maintaining high reliability.

In this exemplary embodiment, the composition ratio a of Li in the above general formula (I) is $0<a\leq1.2$. If a satisfies $0<a\leq1.2$, high capacity and long life can be attained. In contrast, if a exceeds 1.2, capacity reduces. Such a case is not preferable.

In this exemplary embodiment, the theoretical atomic value of Mn in a spinel-type lithium manganese composite oxide is preferably 3.6 or more and more preferably 3.7 or more. If the theoretical atomic value falls within the range, the operating potential can be more stably maintained at a high value. Furthermore, elution of Mn in an electrolytic solution can be more effectively prevented, capacity drop at the time of repeated use can be suppressed. Note that, the theoretical atomic value of Mn refers to a value calculated based on the atomic values of each constituent element other than Mn and composition ratio thereof.

Next, a method for preparing a positive electrode active material will be described. As the raw materials for a positive electrode active material, $Li_2CO_3$, LiOH, $Li_2O$ and $Li_2SO_4$ and the like can be used as a Li raw material. Of them, $Li_2CO_3$ and LiOH are preferable. Examples of the Mn raw material that can be used include various types of Mn oxides such as electrolytic manganese dioxide (EMD), $Mn_2O_3$, $Mn_3O_4$ and CMD (chemical manganese dioxide), $MnCO_3$ and $MnSO_4$. Examples of the Fe raw material that can be used include $Fe_2O_3$, $Fe_3O_4$, $Fe(OH)_2$ and FeOOH. Examples of an F raw material and a Cl raw material that can be used include LiF and LiCl. Examples of raw materials for other substitution elements that can be used include oxides, carbonates, hydroxides, sulfides and nitrates of substitution elements. These may be used alone or in combination of two or more.

These raw materials are weighed so as to satisfy a desired metal composition ratio and mixed. These can be pulverized and mixed by a ball mill, jet mill or the like. The powder mixture thus obtained is baked at a temperature of 400° C. to 1200° C. in air or oxygen to obtain a positive electrode active material. The baking temperature is preferably high in order to diffuse individual elements; however, if the baking temperature is excessively high, oxygen deficiency occurs, with the result that battery characteristics may deteriorate. From this, the baking temperature is preferably 450° C. to 1000° C.

The specific surface area of the obtained lithium manganese composite oxide is preferably 3 $m^2/g$ or less and more preferably 1 $m^2/g$ or less. The larger the specific surface area, the larger the amount of binder is required in preparing a positive electrode. This is unfavorable in view of capacity density of the positive electrode.

(Secondary Battery)

The secondary battery according to this exemplary embodiment has a positive electrode for a secondary battery containing the positive electrode active material for a secondary battery according to this exemplary embodiment, an electrolytic solution and a negative electrode arranged so as to face the positive electrode with the electrolytic solution interposed between them.

The positive electrode can be prepared, for example, by the following method. The positive electrode active material of this exemplary embodiment is mixed with a conductivity imparting agent and further mixed with a binder. The mixture is applied to a positive electrode collector.

Examples of the conductivity imparting agent that can be used include, not only carbon materials such as acetylene black, carbon black, fibrous carbon and graphite, but also metal substances such as Al and conductive oxide powders. Examples of the binder that can be used include polyvinylidene fluoride (PVDF). Examples of the positive electrode collector that can be used include a metal thin film mainly formed of Al and the like. The additive amount of conductivity imparting agent is preferably 1 to 10% by mass relative to the positive electrode active material and the additive amount of binder is preferably 1 to 10% by mass relative to the positive electrode active material. This is because the larger the ratio of the positive electrode active material, the larger the capacity per mass. In contrast, if the ratio of the conductivity imparting agent and the binder is excessively low, conductivity cannot be kept and removal of an electrode may occur.

As the electrolytic solution, a solution prepared by dissolving a lithium salt serving as an electrolyte in a solvent can be used. Examples of the solvent include cyclic carbonates such as propylene carbonate (PC), ethylene carbonate (EC), butylene carbonate (BC) and vinylene carbonate (VC); chain carbonates such as dimethyl carbonate (DMC), diethyl carbonate (DEC), ethyl methyl carbonate (EMC) and dipropyl carbonate (DPC); aliphatic carboxylic acid esters such as methyl formate, methyl acetate and ethyl propionate; γ-lactones such as γ-butyrolactone; chain ethers such as 1,2-ethoxyethane (DEE) and ethoxymethoxyethane (EME); cyclic ethers such as tetrahydrofuran and 2-methyltetrahydrofuran; and aprotonic organic solvents such as dimethylsulfoxide, 1,3-dioxolane, formamide, acetamide, dimethylformamide, dioxolane, acetonitrile, propylnitrile, nitromethane, ethylmonoglyme, phosphoric acid triester, trimethoxymethane, a dioxolane derivative, sulfolane, methylsulfolane, 1,3-dimethyl-2-imidazolidinone, 3-methyl-2-oxazolidinone, a propylene carbonate derivative, a tetrahydrofuran derivative, ethyl ether, 1,3-propanesultone, anisole, N-methylpyrrolidone and a fluorinated carboxylic acid ester. These can be used alone or as a mixture of two or more. Of them, propylene carbonate, ethylene carbonate, γ-butyrolactone, dimethyl carbonate, diethyl carbonate, ethyl methyl carbonate are preferably used alone or as a mixture.

Examples of the lithium salt include $LiPF_6$, $LiAsF_6$, $LiAlCl_4$, $LiClO_4$, $LiBF_4$, $LiSbF_6$, $LiCF_3SO_3$, $LiC_4F_9CO_3$, $LiC(CF_3SO_2)_2$, $LiN(CF_3SO_2)_2$, $LiN(C_2F_5SO_2)_2$, $LiB_{10}Cl_{10}$, a lithium salt of a lower aliphatic carboxylic acid, chloroborane lithium, lithium tetraphenylborate, LiBr, LiI, LiSCN, LiCl and an imide. These can be used alone or as a mixture of two or more types.

The electrolyte concentration of the electrolytic solution can be set, for example, at 0.5 mol/l to 1.5 mol/l. If the electrolyte concentration is higher than 1.5 mol/l, the density and viscosity of the electrolytic solution may increase. In contrast, if the electrolyte concentration is lower than 0.5 mol/l, the electric conductivity of the electrolytic solution may decrease. Note that, a polymer electrolyte may be used in place of the electrolytic solution.

The negative electrode can be prepared, for example, by the following method. The negative electrode active material is mixed with a conductivity imparting agent and further a binder is mixed. The mixture is applied to a negative electrode collector.

Examples of the negative electrode active material that can be used include carbon materials such as graphite, hard carbon and soft carbon; Li metals, Si, Sn, Al, SiO, SnO and $Li_4Ti_5O_{12}$ as a material capable of absorbing and desorbing lithium. They can be used alone or as a mixture. Examples of the conductivity imparting agent that can be used include, not only carbon materials such as acetylene black, carbon black, fibrous carbon and graphite, but also conductive oxide powders. Examples of the binder that can be used include polyvinylidene fluoride (PVDF). Examples of the negative electrode collector that can be used include metal foils mainly formed of Al, Cu and the like.

The secondary battery according to this exemplary embodiment can be constituted by housing, for example, a positive electrode containing a positive electrode active material according to this exemplary embodiment, a negative electrode containing a negative electrode active material capable of absorbing and desorbing lithium, a separator interposed between the positive electrode and the negative electrode to prevent electrical contact between the positive electrode and the negative electrode and a lithium ion conductive electrolytic solution in which the positive electrode, the negative electrode and the separator are to be soaked, in a battery case, airtight. Examples of the form of the secondary battery according to this exemplary embodiment that can be used include, but not particularly limited to, a roller type in which a positive electrode and a negative electrode facing each other with a separator interposed between them are rolled and a laminate type in which these are laminated. Examples of the cell that can be used include a coin type, a laminate pack, a rectangular cell and a cylindrical cell.

FIG. 1 shows a laminate type secondary battery as an example of the secondary battery according to this exemplary embodiment. A positive electrode is formed of a positive electrode active material layer 1 containing the positive electrode active material of this exemplary embodiment and a positive electrode collector 3. A negative electrode is formed of a negative electrode active material layer 2 and a negative electrode collector 4. Between the positive electrode and the negative electrode, a separator 5 is sandwiched. The positive electrode collector 3 is connected to a positive electrode lead terminal 8, whereas the negative electrode collector 4 is connected to a negative electrode lead terminal 7. As an outer package, an outer-package laminate 6 is used and the interior of the secondary battery is filled with an electrolytic solution.

As a method for preparing the secondary battery according to this exemplary embodiment, for example, the following method is mentioned. In a dry air or inert gas atmosphere, a negative electrode and a positive electrode are laminated with a separator interposed between them or the laminate is rolled. Thereafter, it is housed in a battery can or sealed with a flexible film formed of a laminate of a synthesis resin and metal foil. In this manner, a secondary battery can be prepared.

EXAMPLES

Examples of this exemplary embodiment will be described below.

Example 1

As raw materials for a positive electrode active material, $MnO_2$, $Fe_2O_3$, $Al_2O_3$, $Li_2CO_3$ and LiF were weighed so as to satisfy the metal composition ratio shown in Table 1, and the raw materials were pulverized and mixed. The raw material powder mixture was baked at 800° C. for 8 hours to prepare a positive electrode active material.

(Evaluation of Discharge Capacity and Average Discharge Voltage)

The positive electrode active material prepared and carbon (VGCF; manufactured by Showa Denko K. K.) serving as a conductivity imparting agent were mixed and dispersed in a solution having polyvinylidene fluoride (PVDF) serving as a binder dissolved in N-methylpyrrolidone to obtain slurry. The mass ratio of the positive electrode active material, conductivity imparting agent and binder was set at 92/4/4. On an Al collector, the slurry was applied. Thereafter, it was dried in vacuum for 12 hours to obtain an electrode material. From the electrode material, a circle having a diameter of 12 mm was cut out, compressed and molded at 3 t/cm². In this manner, a positive electrode was prepared. As the negative electrode, a Li metal foil was used. As the separator, a polypropylene (PP) film was used. The positive electrode and negative electrode were arranged within a laminate cell so as to face each other with the separator interposed between them. The cell was filled with an electrolytic solution and closed airtight. The electrolytic solution was prepared by dissolving an electrolyte $LiPF_6$ in a solvent containing EC/DEC=3/7 (vol. %), in a concentration of 1 mol/l and put in use.

The battery prepared in the aforementioned manner was evaluated for battery characteristics. In evaluation, the battery was charged at a charge rate of 0.1 C up to 5.1 V and discharged at a rate of 0.1 C up to 3 V. Table 1 shows discharge capacity and average discharge voltage to a lithium metal.

Examples 2 to 33 and Comparative Examples 1 and 2

Batteries were prepared in the same manner as in Example 1 except that positive electrode active materials having the compositions shown in Table 1 were prepared in the same manner as in Example 1, and evaluated for discharge capacity and average discharge voltage. The results are shown in Table 1. Note that MgO was used as a raw material for Mg, $B_2O_3$ as a raw material for B, $Na_2O$ as a raw material for Na, $K_2O$ as a raw material for K, CaO as a raw material for Ca, $TiO_2$ as a raw material for Ti, $SiO_2$ as a raw material for Si, LiCl as a raw material for Cl, NiO as a raw material for Ni, $Cr_2O_3$ as a raw material for Cr and CuO as a raw material for Cu.

Figure 2:
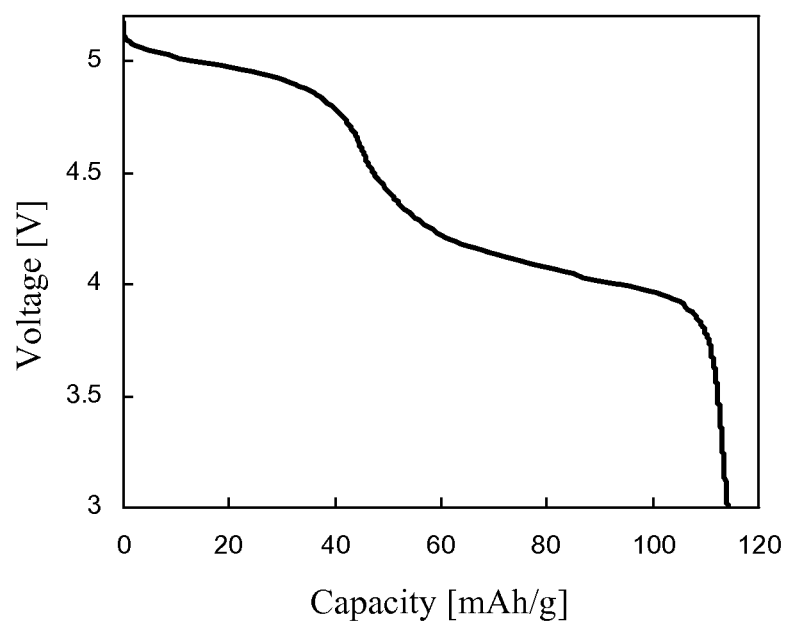
FIG. 2 is a graph showing a discharge curve of a battery using the positive electrode active material of Example 6.

The discharge curve of a battery using the positive electrode active material of Example 6 is shown in FIG. 2. It can be confirmed that a charge-discharge region due to valence change from a trivalent state to a quadrivalent state of Fe is present in the region of 4.8 V or more to Li.

TABLE 1

| Composition formula | Discharge capacity [mAh/g] | Average discharge voltage [V] |
|---|---|---|
| Example 1 | $Li(Fe_{0.6}Mn_{1.35}Al_{0.05})(O_{3.95}F_{0.05})$ | 116 | 4.35 |
| Example 2 | $Li(Fe_{0.6}Mn_{1.3}Al_{0.1})(O_{3.9}F_{0.1})$ | 122 | 4.4 |
| Example 3 | $Li(Fe_{0.6}Mn_{1.2}Al_{0.2})(O_{3.8}F_{0.2})$ | 121 | 4.4 |
| Example 4 | $Li(Fe_{0.6}Mn_{1.1}Al_{0.3})(O_{3.7}F_{0.3})$ | 116 | 4.35 |
| Example 5 | $Li(Fe_{0.5}Mn_{1.45}Al_{0.05})(O_{3.95}F_{0.05})$ | 114 | 4.35 |
| Example 6 | $Li(Fe_{0.7}Mn_{1.25}Al_{0.05})(O_{3.95}F_{0.05})$ | 114 | 4.4 |
| Example 7 | $Li(Fe_{0.8}Mn_{1.15}Al_{0.05})(O_{3.95}F_{0.05})$ | 112 | 4.43 |
| Example 8 | $Li(Fe_{0.9}Mn_{1.05}Al_{0.05})(O_{3.95}F_{0.05})$ | 110 | 4.45 |
| Example 9 | $Li(Fe_{1.0}Mn_{0.95}Al_{0.05})(O_{3.95}F_{0.05})$ | 105 | 4.46 |
| Example 10 | $Li(Fe_{0.6}Mn_{1.3}Al_{0.1})(O_{3.98}F_{0.02})$ | 110 | 4.4 |
| Example 11 | $Li(Fe_{0.6}Mn_{1.3}Al_{0.1})(O_{3.92}F_{0.08})$ | 113 | 4.4 |
| Example 12 | $Li(Fe_{0.6}Mn_{1.3}Al_{0.1})(O_{3.88}F_{0.12})$ | 118 | 4.35 |
| Example 13 | $Li(Fe_{0.6}Mn_{1.3}Al_{0.1})(O_{3.85}F_{0.15})$ | 112 | 4.35 |
| Example 14 | $Li(Fe_{0.6}Mn_{1.38}Mg_{0.02})(O_{3.96}F_{0.04})$ | 116 | 4.35 |
| Example 15 | $Li(Fe_{0.6}Mn_{1.35}Mg_{0.05})(O_{3.9}F_{0.1})$ | 122 | 4.4 |
| Example 16 | $Li(Fe_{0.6}Mn_{1.3}Mg_{0.1})(O_{3.8}F_{0.2})$ | 121 | 4.4 |
| Example 17 | $Li(Fe_{0.6}Mn_{1.37}Li_{0.03})(O_{3.91}F_{0.09})$ | 114 | 4.3 |
| Example 18 | $Li(Fe_{0.6}Mn_{1.38}B_{0.02})(O_{3.98}F_{0.02})$ | 113 | 4.3 |
| Example 19 | $Li(Fe_{0.6}Mn_{1.37}Na_{0.03})(O_{3.91}F_{0.09})$ | 110 | 4.3 |
| Example 20 | $Li(Fe_{0.6}Mn_{1.37}K_{0.03})(O_{3.91}F_{0.09})$ | 109 | 4.3 |
| Example 21 | $Li(Fe_{0.6}Mn_{1.3}Ca_{0.1})(O_{3.8}F_{0.2})$ | 113 | 4.3 |
| Example 22 | $Li(Fe_{0.6}Mn_{1.3}Ti_{0.1})(O_{3.95}F_{0.05})$ | 112 | 4.3 |
| Example 23 | $Li(Fe_{0.6}Mn_{1.3}Si_{0.1})(O_{3.9}F_{0.01})$ | 124 | 4.3 |
| Example 24 | $Li(Fe_{0.6}Mn_{1.35}Al_{0.05})(O_{3.95}Cl_{0.05})$ | 116 | 4.3 |
| Example 25 | $Li(Fe_{0.6}Mn_{1.2}Al_{0.1}Ti_{0.1})(O_{3.9}F_{0.1})$ | 123 | 4.35 |
| Example 26 | $Li(Fe_{0.6}Mn_{1.2}Mg_{0.05}Si_{0.1})(O_{3.9}F_{0.1})$ | 128 | 4.35 |
| Example 27 | $Li(Fe_{0.6}Mn_{1.33}Mg_{0.02}Al_{0.05})(O_{3.91}F_{0.09})$ | 128 | 4.35 |
| Example 28 | $Li(Fe_{0.5}Ni_{0.1}Mn_{1.3}Al_{0.1})(O_{3.9}F_{0.1})$ | 113 | 4.4 |
| Example 29 | $Li(Fe_{0.4}Ni_{0.2}Mn_{1.3}Al_{0.1})(O_{3.9}F_{0.1})$ | 112 | 4.43 |
| Example 30 | $Li(Fe_{0.5}Cr_{0.1}Mn_{1.3}Al_{0.1})(O_{3.9}F_{0.1})$ | 114 | 4.35 |
| Example 31 | $Li(Fe_{0.4}Cr_{0.2}Mn_{1.3}Al_{0.1})(O_{3.9}F_{0.1})$ | 115 | 4.37 |
| Example 32 | $Li(Fe_{0.3}Cr_{0.3}Mn_{1.3}Al_{0.1})(O_{3.9}F_{0.1})$ | 117 | 4.38 |
| Example 33 | $Li(Fe_{0.5}Cu_{0.1}Mn_{1.3}Al_{0.1})(O_{3.9}F_{0.1})$ | 110 | 4.35 |
| Comparative Example 1 | $Li(Mn_{1.9}Al_{0.1})O_4$ | 110 | 4 |
| Comparative Example 2 | $Li(Fe_{0.6}Mn_{1.4})O_4$ | 108 | 4.3 |

As shown in Examples 1 to 33, average discharge voltages were increased compared to Comparative Example 1 by using Fe and so on as M in the general formula (I) and substituting Mn with Fe and so on. As shown in Examples 1 to 4, discharge capacity and average discharge voltage were increased compared to Comparative Example 2 by using Al as Y in the general formula (I) and substituting Mn with Al, and further using F as Z in the general formula (I) and substituting oxygen with F. From the results of discharge capacity and average discharge voltage obtained by changing substitution amount of Al and F in Examples 1 to 4, it was confirmed that the same effects can be obtained if the substitution amounts of Al and F are changed. As shown in Example 1 and Examples 5 to 9, a high average discharge voltage was obtained in the case where Fe was used as M in the general formula (I) and in the case where the substitution amount x of Fe was changed. As shown in Examples 10 to 13, a high discharge capacity and average discharge voltage were obtained in the case where the value of w, which is composition of Z in the general formula (I) was changed. As shown in Examples 14 to 16, a high discharge capacity and average discharge voltage were obtained in the case where Mg was used as Y in the general formula (I). The same effects were obtained in the case where the composition of Mg and F was changed. As shown in Examples 17 to 23, a high discharge capacity and average discharge voltage were obtained in the cases where Li, B, Na, K, Ca, Ti and Si were used as Y in the general formula (I). As shown in Example 24, a high discharge capacity and average discharge voltage were obtained in the case where Cl was used as Z in the general formula (I). As shown in Examples 25 to 27, a high discharge capacity and average discharge voltage were obtained in the case where two types element or more were used as Y in the general formula (I). As shown in Examples 28 to 33, a high discharge capacity and average discharge voltage were obtained in the case where Fe and elements except Fe were used as M in the general formula (I).

(Evaluation of Cycle Characteristics)

Using positive electrodes prepared in Example 2, Example 4 and Comparative Example 2, cycle characteristics was evaluated. A negative electrode was prepared as follows. To graphite serving as a negative electrode active material, carbon (VGCF; manufactured by Showa Denko K. K.) serving as a conductivity imparting agent was mixed. This mixture was dispersed in a solution having polyvinylidene fluoride (PVDF) dissolved in N-methylpyrrolidone to prepare slurry. The mass ratio of the negative electrode active material, conductivity imparting agent and binder was set at 90/1/9. On a Cu collector, the slurry was applied. Thereafter, it was dried in vacuum for 12 hours to obtain an electrode material. From the electrode material, a circle having a diameter of 13 mm was cut out, compressed and molded at 1.5 t/cm$^2$ to obtain a negative electrode. As the separator, a PP film was used. The positive electrode and the negative electrode were arranged within a coin cell so as to face each other with the separator interposed between them. The cell was filled with an electrolytic solution and closed airtight to prepare a battery. The electrolytic solution was prepared by dissolving an electrolyte LiPF$_6$ in a solvent containing EC/DEC=3/7 (vol. %) in a concentration of 1 mol/l and put in use.

Cycle characteristics were evaluated by charging a battery at a charge rate of 1 C up to 5.1 V in a constant-temperature vessel of a temperature of 20° C. and thereafter charged at a constant voltage of 5.1 V. The total charge time was set at 150 minutes. Then, the battery was discharged at a rate of 1 C up to 3 V. This procedure was repeated 500 cycles. Thereafter, capacity retention rate was evaluated. The results are shown in Table 2.

TABLE 2

| | Composition formula | Capacity retention rate after 500 cycles [%] |
|---|---|---|
| Example 2 | Li(Fe$_{0.6}$Mn$_{1.3}$Al$_{0.1}$)(O$_{3.9}$F$_{0.1}$) | 51 |
| Example 4 | Li(Fe$_{0.6}$Mn$_{1.1}$Al$_{0.3}$)(O$_{3.7}$F$_{0.3}$) | 55 |
| Comparative Example 2 | Li(Fe$_{0.6}$Mn$_{1.4}$)O$_4$ | 43 |

It was confirmed that the capacity retention rate after the cycles increases by using a positive electrode active material in which Mn is substituted with Y in the general formula (I) and oxygen is substituted with Z in the general formula (I). It is presumed that cycle characteristics are improved due to effects such as stabilization of a crystal structure and suppression of Mn elution.

This application claims a priority right based on Japanese Patent Application No. 2010-172317 filed on Jul. 30, 2010, the disclosure of which is incorporated herein in its entirety.

In the above, the invention of the present application has been explained by way of exemplary embodiments and Examples; however, the invention of the present application is not limited to the above exemplary embodiments and Examples. The constitution and details of the invention of the present application can be modified in various ways within the scope of the invention of the present application as long as those skilled in the art can understand them.

REFERENCE SIGNS LIST

1 Positive electrode active material layer
2 Negative electrode active material layer
3 Positive electrode collector
4 Negative electrode collector
5 Separator
6 Outer-package laminate
7 Negative electrode lead terminal
8 Positive electrode lead terminal

The invention claimed is:

1. A positive electrode active material for a secondary battery, which is a lithium manganese composite oxide represented by the following general formula (I)

$$\text{Li}_a(\text{M}_x\text{Mn}_{z-x-y}\text{Y}_y)(\text{O}_{4-w}\text{Z}_w) \tag{I}$$

wherein in the formula (I), 0.5≤x≤1.2, 0<y≤0.3, 0≤a≤1.2, and 0<w<1; M comprises at least Fe and may further comprise at least one selected from the group consisting of Ni, Cr and Cu other than Fe; Y is at least one selected from the group consisting of Li, Be, B, Na, Mg, Al, K, Ca, Ti and Si; and Z is at least one of F and Cl.

2. The positive electrode active material for a secondary battery according to claim 1, wherein M in the above general formula (I) is Fe.

3. The positive electrode active material for a secondary battery according to claim 1, wherein x in the above general formula (I) satisfies 0.6≤x≤1.

4. The positive electrode active material for a secondary battery according to claim 1, wherein Y in the above general formula (I) is at least one selected from the group consisting of Li, Mg and Al.

5. The positive electrode active material for a secondary battery according to claim 1, wherein a charge-discharge region is present at 4.8 V or more to a lithium reference potential.

6. A positive electrode for a secondary battery comprising the positive electrode active material for a secondary battery of claim 1.

7. A secondary battery comprising the positive electrode for a secondary battery of claim 6, an electrolytic solution and a negative electrode arranged so as to face the positive electrode with the electrolytic solution interposed between them.

8. The positive electrode active material for a secondary battery according to claim 1, wherein Y in the above general formula (I) is at least one selected from the group consisting of Li and Al.

* * * * *